Jan. 5, 1926.
W. G. STRUTHERS
SHOCK ABSORBER
Filed August 4, 1924
1,568,697
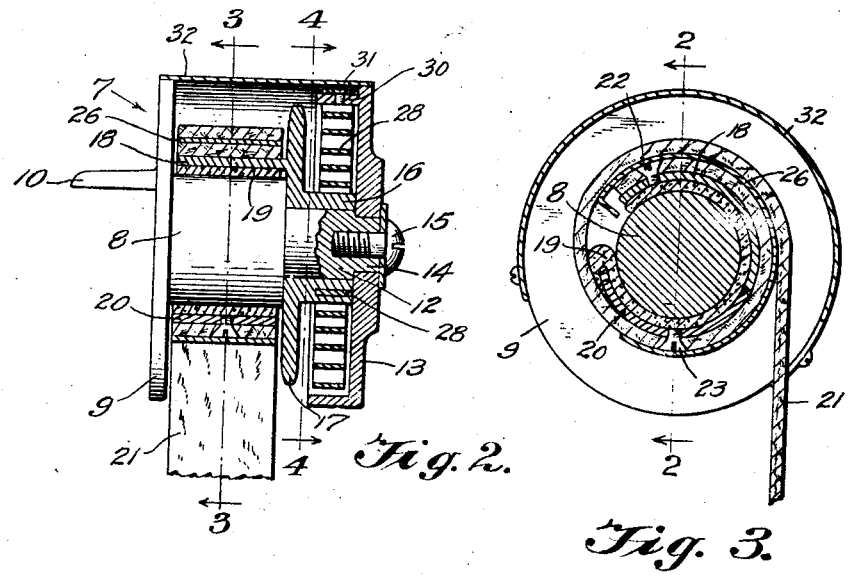
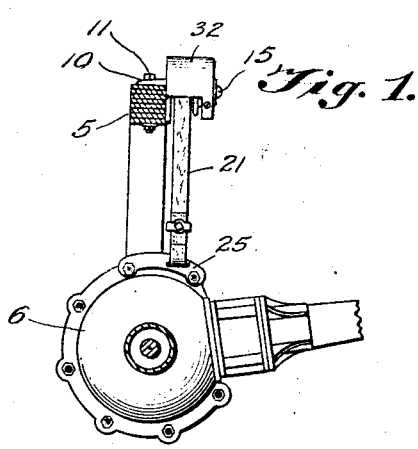
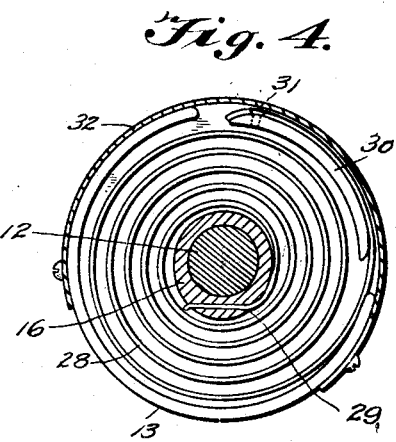
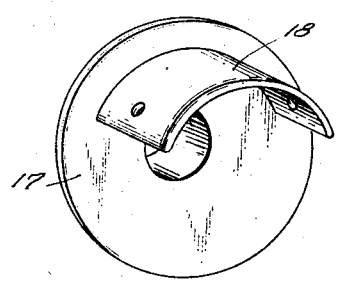
INVENTOR
William G. Struthers
BY
Pierre Barnes
ATTORNEY Patented Jan. 5, 1926.

1,568,697

UNITED STATES PATENT OFFICE.

WILLIAM G. STRUTHERS, OF OAKLAND, CALIFORNIA.

SHOCK ABSORBER.

Application filed August 4, 1924. Serial No. 729,941.

*To all whom it may concern:*

Be it known that I, WILLIAM G. STRUTHERS, a citizen of the United States, residing at Oakland, in the county of Alameda and State of California, have invented certain new and useful Improvements in Shock Absorbers, of which the following is a specification.

This invention relates to shock absorbers and snubbers and, more particularly, to improvements in the devices of this character illustrated and described in patent application Serial No. 657,015 filed by me August 13, 1923.

The object of the present invention is the perfecting of the apparatus to render the same more durable and efficient.

More specific objects and advantages of the invention will appear in the following description.

The invention consists in the novel construction, arrangement and combination of parts as hereinafter described, claimed, and illustrated in the accompanying drawing, wherein,—

Figure 1 is a transverse vertical section through the rear axle housing and a body-supporting spring of an automobile having applied thereto an embodiment of my invention, shown in side elevation. Fig. 2 is a view in longitudinal vertical section of the invention taken substantially on line 2—2 of Fig. 3. Figs. 3 and 4 are transverse sectional views through 3—3 and 4—4 of Fig. 2. Fig. 5 is a perspective view of the yoke member shown detached.

In said drawing, the invention is illustrated as applied to a vehicle spring 5 at or about the position of the connection of the spring to the vehicle's frame or body, not shown, and to the axle housing 6 at the rear end of an automobile, although it is to be understood that the device may be applied otherwise.

In the present embodiment, I provide a body 7 comprising a horizontally disposed cylindrical portion 8, hereinafter designated as the drum, extending axially from a disk element 9 having a bracket element 10 whereby said body is secured as by means of a bolt 11 (Fig. 1) to a support afforded by the vehicle spring 5.

The body 7 is also provided with an arbor element 12 protruding axially from the drum 8 which serves as a support for a cylindrical shell member 13 having in the end thereof a polygonal hole to receive a correspondingly shaped portion 14 of said arbor for engaging the shell member thereto against rotation. 15 represents a bolt engaging in a screw threaded hole in the arbor for coupling the shell therewith.

Mounted for rotation on the arbor 12 is a disk shaped yoke 17 having a hub element 16 at one side and an arcuate jaw element 18 at its other side and in concentric relation with respect to the drum 8. Seated upon the peripheral surface of said drum is an incomplete ring 19 of leather, asbestos or other suitable material constituting a frictional gripping member with respect to the drum.

As shown in Fig. 3, the drum gripping member 19 is positioned between the jaw element 18 and the drum and likewise between the latter and an arcuate plate 20 which constitutes a second jaw element complementary to the yoke jaw element 18.

21 represents a flexible strap which is coiled about the jaw elements 18 and 20, the inner convolution of which is secured to said jaw elements as by means of rivets or screws 22 and 23, as shown in Fig. 3, and has its free end connected as by means of an attachment 25 to the axle housing 6 as shown in Fig. 1. The strap 21 is made of leather, fabric or other suitable material.

To prevent the inner coils of the strap 21 becoming embedded one with the other and to eliminate friction between the coils, I provide an interposing metal band 26.

28 represents a helical spring, see Fig. 4, surrounding the hub portion 16 of said yoke and having one of its ends secured to such hub as by engaging in a slot 29 thereof and its other end is secured to a flange element 30 of the shell 13 as by means of a screw 31.

32 represents a cover or guard plate secured to the body part 9 and to the shell 13 for protecting the drum, the drum gripping member, etc., from dirt or dust.

The strap 21 by being fastened to the jaws 18 and 20 serves, in effect, to hingedly connect the jaws together.

The spring 28 acts through the medium of the yoke and the jaw elements 18 and 20 to yieldingly retain the drum-gripping member in its inoperative relation with the drum 8 to permit up-and-down movements of the vehicle body, subject to the action of the vehicle springs and with respect to the wheel axle and obviate slack in the strap 21.

When the vehicle wheels, however, encounter hummocks or other obstacles in the road, the resultant spring rebounding movements of the body exercise a powerful tensional force through the strap causing the coils of the latter to affect the jaw 20 to cooperate with the yoke jaw 18 whereby the gripping member is influenced to frictionally embrace the drum 8 to gradually absorb the shock.

An advantage of the present invention is that the spring controlled yoke and jaws afford a rapid release of the gripping member with respect to the drum when the strap is not subjected to abnormal tension as under ordinary road conditions.

What I claim, is,—

1. In a shock absorber, a stationary drum provided with an arbor extension, a yoke mounted upon said arbor extension, a jaw element integral with and protruding from one side of said yoke, a second jaw element separate from said yoke, a drum gripping member interposed between both of said jaws and the drum, a flexible member wound about said jaws to actuate the drum gripping member, and a spring connected to said yoke and tending to prevent the unwinding of said flexible member with respect to the jaws.

2. In a shock absorber, a stationary drum, a friction drum gripping member revolubly mounted on the drum, a rotatable yoke having integral therewith a jaw element, a second jaw element separate from said yoke, a flexible member connected to both of said jaw elements and coiled about the same to cause the drum gripping member to grip the drum when said flexible member is pulled outwardly, and a spring operatively connecting said drum and the yoke whereby said yoke is rotated to retract said flexible member when the tension on the same is relieved.

3. In a shock absorber, a stationary drum having an arbor extending axially therefrom, a drum-gripping member mounted upon said drum, a yoke rotatable upon said arbor, two complementary jaw elements revoluble with said yoke and engaging said member at diametrically opposite sides of the drum, a flexible member secured to both of said jaw elements and coiled about the same, a shell rigidly secured to said arbor, and a coil spring having its ends connected to said shell and to the yoke respectively for rotating the yoke for retracting said flexible member when the tension thereon is relieved.

4. In a shock absorber, a non-rotatable drum, a yoke connected with said drum for relative rotary movement, said yoke being provided with a jaw element, a second jaw element, a flexible drum gripping member provided interiorly of the jaws upon the peripheral surface of said drum, a flexible strap connected to said jaws and wound thereabout for a number of convolutions, and a metal band arranged to alternate with the strap in the successive convolutions thereof.

5. In a shock absorber, a non-rotatable drum, a yoke having a jaw element disposed concentrically of the drum, a second jaw element, a drum-gripping member mounted upon said drum interiorly of the jaws, a flexible strap connected to both of said jaws about the jaws exteriorly of said gripping member, and a flexible band interposed between successive convolutions of the strap.

6. In a shock absorber, a non-rotatable drum, a drum-gripping member revolubly mounted thereon, a rotatable yoke, a flexible strap coiled about said member and having one of its ends connected to the yoke, a metal jaw element connected to the strap and bearing upon said member, a spring operatively connected to said yoke and tending to yieldingly retain the jaw in inoperative relation with said member, and means interposed between the successive convolutions of said strap to prevent the same from coming into direct contact with each other.

7. In a shock absorber, a non-rotatable drum having an arbor element extending axially therefrom, a yoke member rotatably mounted upon said arbor, said yoke member being provided with an arcuate jaw element disposed concentrically of the drum, a second arcuate jaw element separate from said yoke member, a drum-gripping member interposed between the drum and said jaw elements, a strap secured to both of said jaw elements and providing a flexible connection therebetween, said straps being coiled about both of the jaw elements, and a spring connected to the yoke and tending to prevent the uncoiling of said strap from about the jaw elements.

Signed at Oakland California, this 17th day of July 1924.

WILLIAM G. STRUTHERS.